(12) United States Patent
van der Weide et al.

(10) Patent No.: US 8,059,037 B2
(45) Date of Patent: Nov. 15, 2011

(54) BROADBAND ANTENNAS AND RELATED SYSTEMS, DEVICES, AND METHODS

(75) Inventors: Daniel van der Weide, Verona, WI (US); John Grade, Waunakee, WI (US)

(73) Assignee: Tera-X, LLC, Verona, WI (US)

( * ) Notice: Subject to any disclaimer, the term of this patent is extended or adjusted under 35 U.S.C. 154(b) by 768 days.

(21) Appl. No.: 12/116,663

(22) Filed: May 7, 2008

(65) Prior Publication Data
US 2008/0278385 A1 Nov. 13, 2008

Related U.S. Application Data

(60) Provisional application No. 60/928,047, filed on May 7, 2007.

(51) Int. Cl.
*H01Q 1/24* (2006.01)
(52) U.S. Cl. ............................ 343/702; 343/700 MS
(58) Field of Classification Search ........... 343/700 MS, 343/702
See application file for complete search history.

(56) References Cited

U.S. PATENT DOCUMENTS

| | | | |
|---|---|---|---|
| 3,659,227 A | 4/1972 | Whistler | |
| 3,887,925 A | 6/1975 | Ranghelli | |
| 5,138,323 A | 8/1992 | Taylor | |
| 5,977,929 A | 11/1999 | Ryken | |
| 6,271,579 B1 * | 8/2001 | Going et al. | 257/664 |
| 6,741,125 B2 * | 5/2004 | Arai et al. | 330/66 |
| 6,815,683 B2 | 11/2004 | Federici | |
| 7,298,343 B2 | 11/2007 | Forster | |
| 7,453,363 B2 | 11/2008 | Reynolds | |
| 7,515,051 B2 | 4/2009 | Wagner | |
| 7,643,869 B1 | 1/2010 | Dabiri | |
| 2004/0159957 A1 * | 8/2004 | Lee | 257/778 |
| 2008/0129641 A1 | 6/2008 | Lee et al. | |

OTHER PUBLICATIONS

Akkarackthalin, P., et al., "Distributed broadband frequency translator," presented at Microwave Symposium Digest, 1998 IEEE MTT-S International, 1998.
Cheville, R.A. and Grischkowsky, D., "Time domain terahertz impulse ranging studies," Applied Physics Letters, vol. 67, pp. 1960-1962, 1995.
Fattinger, C. and Grischkowsky, D., "Terahertz beams," Applied Physics Letters, vol. 54, pp. 490-492, 1989.
Grischkowsky, D., et al., "Far-infrared time-domain spectroscopy with terahertz beams of dielectrics and semiconductors," Journal of the Optical Society of America B, vol. 7, pp. 2006-2015, 1990.
Hagness, S.C., et al., "Three-dimensional FDTD analysis of a pulsed microwave confocal system for breast cancer detection: Design of an antenna-array element," IEEE Transactions on Antennas and Propagation, vol. 47, pp. 783-791, May 1999.
Herskovitz, D., "Wide, Wider, Widest," Microwave Journal, vol. 38, pp. 26-40, 1995.
Hu, B.B. and Nuss, M.C. "Imaging with terahertz waves," Optics Letters, vol. 20, pp. 1716-1718, Aug. 15, 1995.
Lee, K, et al., "Modeling and investigation of a geometrically complex UWB GPR antenna using FDTD," IEEE Trans. Antennas and Propagation, vol. 52, pp. 1983-1991, 2004.

(Continued)

*Primary Examiner* — Tho G Phan
(74) *Attorney, Agent, or Firm* — Casimir Jones SC

(57) ABSTRACT

The present invention provides antennas and related methods of use, devices, and systems. In particular, the present invention provides broadband antennas and related interfaces to sources and detectors. In some embodiments, the devices of the present invention are used for radiation emission, radiation detection, and/or radiation reflection.

13 Claims, 3 Drawing Sheets

OTHER PUBLICATIONS

Li, X, et al., "Numerical and experimental investigation of an ultrawideband ridged pyramidal-horn antenna with curved launching plane for pulse radiation," IEEE Antennas and Wireless Propagation Letters, vol. 2, pp. 259-262, 2003.

Van Der Weide, D.W., "Wideband terahertz sensing and spectroscopy with electronic sources and detectors," in Terahertz sources and systems, vol. 27, NATO Science Series, R. E. Miles, P. Harrison, and D. Lippens, Eds. Dordrecht, The Netherlands: Kluwer Academic Publishers, 2001, pp. 301-314.

Van Der Weide, D.W., et al., "Gas-absorption spectroscopy with electronic terahertz techniques," IEEE Transactions on Microwave Theory and Techniques, vol. 48, pp. 740-743, 2000.

Van Der Weide, D.W., et al., "Spectroscopy with electronic terahertz techniques," Proceedings of the SPIE The International Society for Optical Engineering, vol. 3828, pp. 276-284, 1999.

Van Exeter, M. and Grischkowsky, D., "Optical and electronic properties of doped silicon from 0.1 to 2 THz," Applied Physics Letters, vol. 56, pp. 1694-1696, 1990.

Van Exeter, M., "Terahertz time-domain spectroscopy of water vapor," Optics Letters, vol. 14, pp. 1128-1130, 1989.

Van Der Weide D.W., et al., "Picosecond dual-source interferometer extending Fourer-transform spectrometer to microwave regime," in 1996 IEEE MTT-S International Microwave Symposium Digest, vol. 3. New York, NY, USA: IEEE, 1996, pp. 1731-1734.

Van Der Weide, D.W., "Delta-doped Schottky diode nonlinear transmission lines for 480-fs, 3.5-V transients," Applied Physics Letters, vol. 65, pp. 881-883, 1994.

Van Der Weide, et al., "Electronic picosecond-pulse interferometer probing the millimeter-wave response of a quantum-dot system," presented at Quantum Optoelectronics, Dana Point, CA, 1995.

Li, et al., "Portable THz system and its applications," (1999), SPIE Proceedings, vol. 3616, pp. 126-135.

Hussain, M.A., "High frequency sparse array synthesis for target identification signatures," (2006), SPI Proceedings, vol. 6234, pp. 6234Y-1 to 6234Y-14.

Woodward, et al., "Terahertz pulse imaging of ex vivo Basal cell carcinoma," (2003), Journal of Investigative Dermatology, vol. 120, No. 1, pp. 72-78.

Federici, et al., "THz imaging and sensing for security applications- explosives, weapons, and drugs," (2005), Semiconductor Science and Technology, vol. 20, pp. S266-S280.

Choi, et al., Potential for detection of explosive and biological hazads with electronic terahertz systems, (2004), Philosophical Transactions of the Yoral Society A, vol. 362, pp. 337-349.

* cited by examiner

BROADBAND ANTENNAS AND RELATED SYSTEMS, DEVICES, AND METHODS

CROSS-REFERENCE TO RELATED APPLICATION

The present invention claims priority to pending U.S. Provisional Application No. 60/928,047, filed May 7, 2007, entitled "Broadband Antennas and Related Systems, Devices, and Methods," which is herein incorporated by reference in its entirety.

BACKGROUND

Improved broadband antennas are needed.

SUMMARY

The present invention provides antennas and related methods of use, devices, and systems. In particular, the present invention provides broadband antennas and related interfaces to sources and detectors. In some embodiments, the devices of the present invention are used for radiation emission, radiation detection, and/or radiation reflection.

DETAILED DESCRIPTION

Figure 1:
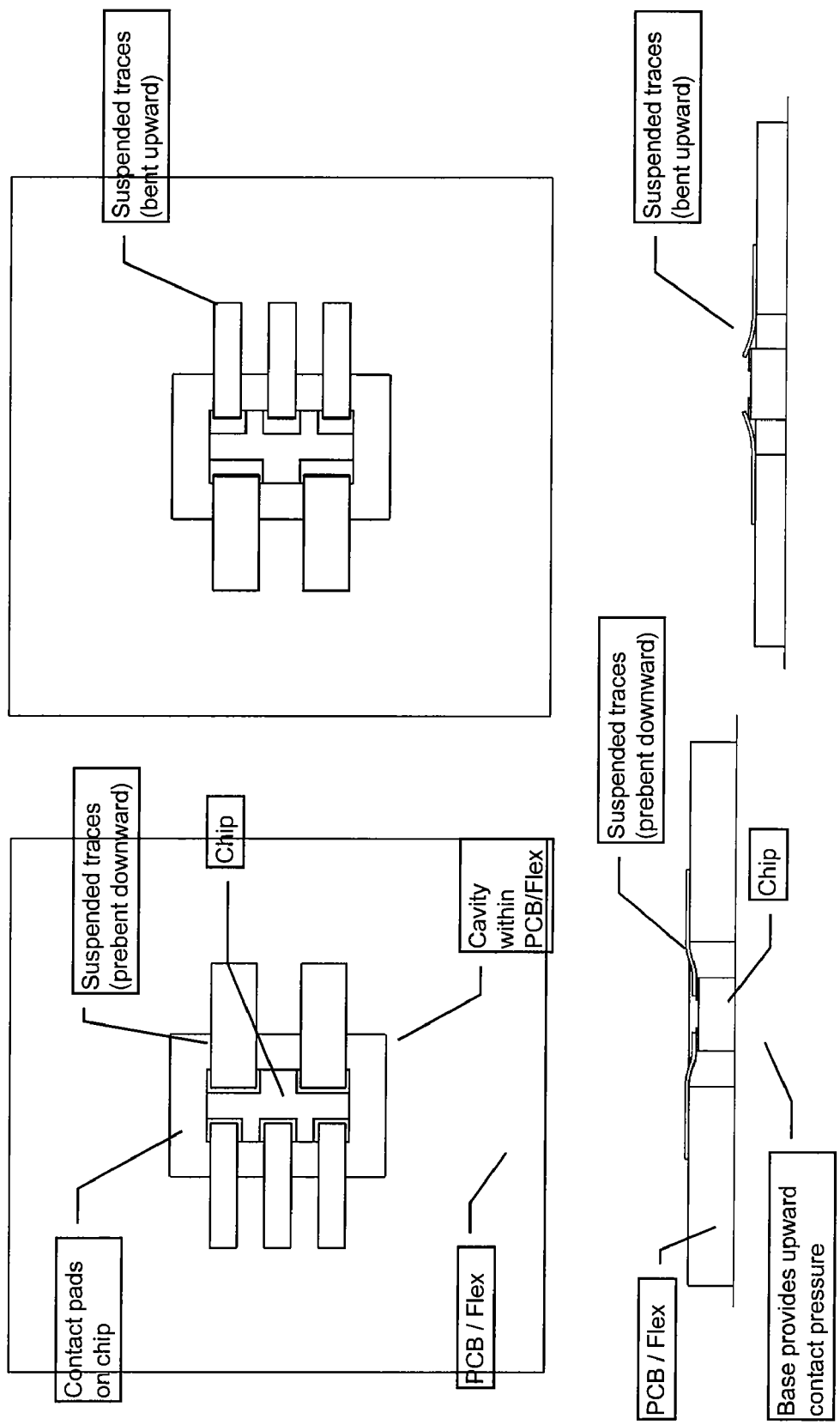
FIG. 1 shows a high-frequency electrical coupler embodiment.

The present invention provides antennas and related methods of use, devices, and systems. In particular, the present invention provides broadband antennas and related interfaces to sources and detectors. In some embodiments, the devices of the present invention are used for radiation emission, radiation detection, and/or radiation reflection.

In some embodiments, the present invention provides devices comprising one or more antennas. The present invention is not limited to a particular type or kind of antenna. In some embodiments, the antenna is a broadband antenna. In some embodiments, the antenna comprises one or more electrodes. The antennas of the present invention are not limited to a particular type or kind of electrode. In some embodiments, the electrode is a non-planar electrode.

The present invention is not limited to a particular method or technique for generating a non-planar electrode. In some embodiments, non-planar electrodes are generated by bending a thin dielectric film. In some embodiments, the thin dielectric film has thereon a patterned metal trace. The present invention is not limited to a particular patterned metal trace. In some embodiments, the patterned metal trace is a flex circuit.

In some embodiments, the electrode has a curvature. The present invention is not limited to a particular degree of curvature (e.g., 10 degree curvature, 20 degree curvature, 50 degree curvature, 90 degree curvature, 180 degree curvature, 350 degree curvature). In some embodiments, the degree of curvature is determined by a separate forming element.

In some embodiments, the present invention provides devices comprising one or more electrical couplers. The present invention is not limited to a particular type or kind of electrical coupler. In some embodiments, the electrical coupler is a high-frequency electrical coupler. In some embodiments, the high-frequency electrical coupler is used to bring into contact electrodes on the surface of an integrated chip (e.g., NLTL; non-linear transmission line) with suspended conductive traces on a PCB and/or flex circuit. In some embodiments, the integrated chip GaAs NLTL. In some embodiments, the high-frequency electrical coupler is used to bring into contact a cylindrical or conical electrode (e.g., the center pin of a GPO connector) with suspended conductive traces on a PCB and/or flex circuit.

The integrated chip is not limited to a particular positioning within the PCB and/or flex circuit. In some embodiments, the integrated chip is located within a cavity in the PCB and/or flex circuit dielectric layer.

The electrical coupler provides reliable electrical contact through elastic deformation of the suspended conductive traces and/or the PCB or flex circuit dielectric layer. In some embodiments, the electrical coupler establishes reliable electrical contact through elastic deformation of the suspended conductive traces and/or the PCB or flex circuit dielectric layer with a pressure on the back surface of the integrated chip. The present invention is not limited to a particular type or kind of pressure. In some embodiments, the pressure of the back surface of the integrated chip is generated by elastic deformation of suspended conductive traces on the back surface of the PCB and/or flex circuit. In some embodiments, the pressure of the back surface of the integrated chip is generated by elastic deformation of the PCB and/or flex circuit dielectric.

Figure 2:
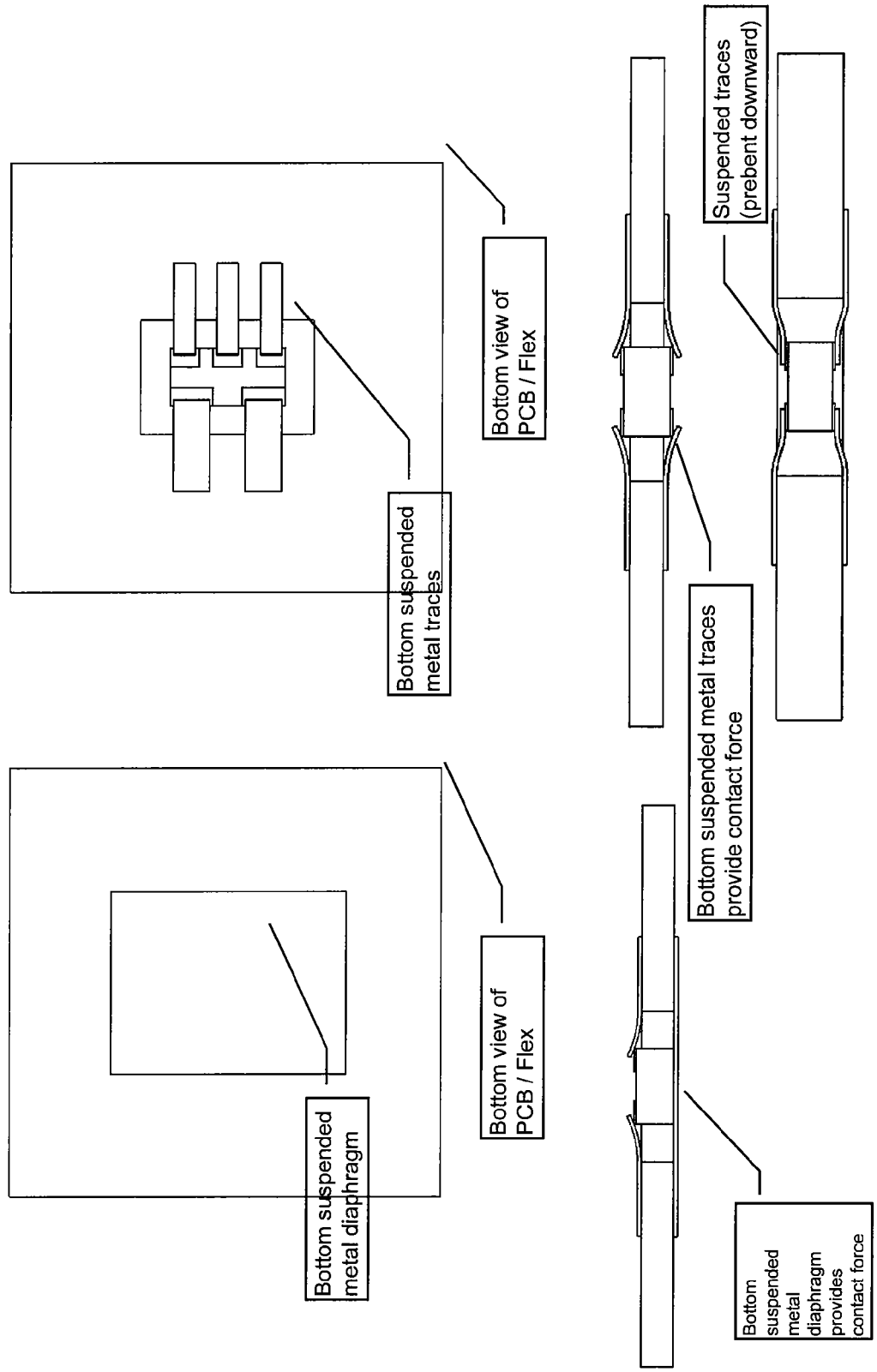
FIG. 2 shows a high-frequency electrical coupler embodiment.
Figure 3:
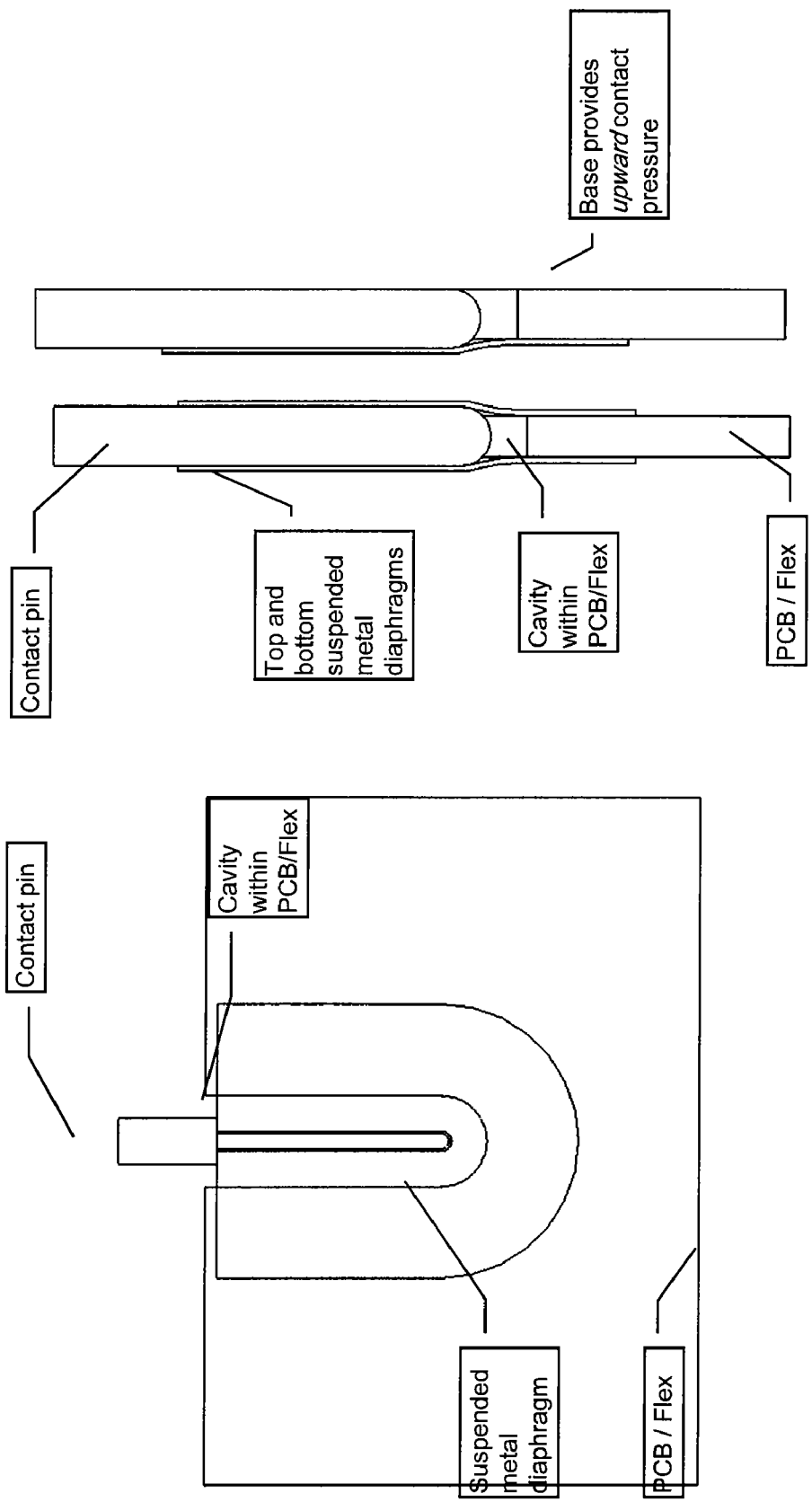
FIG. 3 shows a high-frequency electrical coupler embodiment.

FIGS. 1, 2 and 3 show embodiments of high-frequency electrical coupler embodiments of the present invention. The present invention is not limited to these embodiments.

In some embodiments, the present invention provides one or more non-planar electrodes. The present invention is not limited to a particular manner of generating a non-planar electrode. In some embodiments, non-planar electrodes of the present invention are generated by applying a metal film to a non-planar dielectric part. In some embodiments, the metal is electroless plated. In some embodiments, the metal is electroplated. In some embodiments, the metal is painted. In some embodiments, the metal is bonded.

The present invention is not limited to a particular manner or technique for forming a dielectric part. In some embodiments, the dielectric part is formed via injection molding. In some embodiments, the dielectric part is formed via stereolithography.

The present invention is not limited to particular uses for the antennas, electrical couplers and electrodes. In some embodiments, the devices of the present invention are used for radiation emission, radiation detection, and/or radiation reflection. In some embodiments, the devices of the present invention are used in for surveillance purposes.

The present invention provides systems and/or devices comprising one or more components of the present invention and/or sub-parts necessary, sufficient and/or useful for the formation of devices of the present invention.

The invention claimed is:

1. A device comprising a high frequency electrical coupler configured to bring into contact electrodes on the surface of an integrated circuit with suspended conductive traces on a PCB or Flex circuit.

2. The device of claim 1, wherein said integrated circuit is an NLTL integrated circuit.

3. The device of claim 1, wherein said integrated chip is positioned within a cavity of said PCB or Flex circuit.

4. The device of claim 1, wherein said high frequency electrical coupler provides reliable electrical contact, wherein said reliable electrical contact is established through elastic deformation of suspended conductive traces and/or the PCB or Flex circuit dielectric.

5. The device of claim 1, wherein said high frequency electrical coupler provides reliable electrical contact, wherein said reliable electrical contact is established through elastic deformation of suspended conductive traces and/or the PCB or Flex circuit dielectric.

6. The devices of claim 1, wherein said devices are configured for radiation emission, radiation detection and/or radiation reflection.

7. A device comprising a high frequency electrical coupler configured to bring into contact a cylindrical or conical electrode with suspended conductive traces on a PCB or Flex circuit.

8. The device of claim 7, wherein cylindrical or conical electrode is a pin of a GPO connector.

9. The device of claim 7, wherein said integrated circuit is an NLTL integrated circuit.

10. The device of claim 7, wherein said integrated chip is positioned within a cavity of said PCB or Flex circuit.

11. The device of claim 7, wherein said high frequency electrical coupler provides reliable electrical contact, wherein said reliable electrical contact is established through elastic deformation of suspended conductive traces and/or the PCB or Flex circuit dielectric.

12. The device of claim 7, wherein said high frequency electrical coupler provides reliable electrical contact, wherein said reliable electrical contact is established through elastic deformation of suspended conductive traces and/or the PCB or Flex circuit dielectric.

13. The devices of claim 7, wherein said devices are configured for radiation emission, radiation detection and/or radiation reflection.

\* \* \* \* \*